United States Patent [19]
Orr

[11] Patent Number: 5,941,675
[45] Date of Patent: Aug. 24, 1999

[54] TOW DOLLY

[75] Inventor: David G. Orr, Chanute, Kans.

[73] Assignee: Magna Tech, Inc., Chanute, Kans.

[21] Appl. No.: 09/073,620

[22] Filed: May 6, 1998

[51] Int. Cl.⁶ .................................................. B60B 29/00
[52] U.S. Cl. ........................ 414/428; 414/427; 414/426; 280/402; 280/43.21
[58] Field of Search .................................. 414/426, 427, 414/428, 429, 430, 563, 589, 590; 280/402, 79.4; 254/3 R, 8 R, DIG. 12

[56] References Cited

U.S. PATENT DOCUMENTS

| | | | |
|---|---|---|---|
| 660,683 | 10/1900 | Hendon | 280/43.21 |
| 2,079,293 | 5/1937 | Kirby | 280/43.21 |
| 2,172,911 | 9/1939 | Kirby | 280/43.21 |
| 2,362,981 | 11/1944 | Baum | 414/428 |
| 3,123,237 | 3/1964 | Talbert | 414/427 |
| 3,297,336 | 1/1967 | Lassen | 280/43.21 |
| 4,696,484 | 9/1987 | Casey | 414/427 X |
| 4,900,215 | 2/1990 | Nowell | 414/428 |
| 5,778,488 | 7/1998 | Tsai | 280/43.12 X |

FOREIGN PATENT DOCUMENTS

| | | | |
|---|---|---|---|
| 2419177 | 11/1979 | France | 414/427 |
| 2405962 | 8/1974 | Germany | 414/427 |
| 483982 | 8/1953 | Italy | 280/43.21 |
| 607704 | 10/1978 | Switzerland | 414/426 |

*Primary Examiner*—Frank E. Werner
*Attorney, Agent, or Firm*—McCaleb, Lucas & Brugman

[57] ABSTRACT

A knock-down towing dolly assembly having a wheel supported cradle for engaging a pair of front or rear wheels of a vehicle to be towed; the assembly being capable of elevating the vehicle's cradle engaged wheels in response to operation of improved automatic locking and unlocking actuators; associated one with each of four towing dolly wheels whereby the cradle engaged wheels of the vehicle are elevated to a towing position.

6 Claims, 4 Drawing Sheets

TOW DOLLY

This invention relates to vehicle towing systems and more particularly concerns a wheel engaging dolly for elevating coaxial pairs of vehicle wheels. Towing dollies for raising pairs of coaxial vehicle wheels typically employ a pair of frame-like bases for supporting pairs of dolly wheels. Such dolly bases are placed outside two vehicle wheels to be lifted or elevated; the two bases being cross connected by parallel spaced tubular axles which are typically longitudinally adjustable to accommodate variations in vehicle wheel lateral spacings. Suitable mechanisms are provided for positioning the dolly wheels between a raised position and a lowered towing position which serves to elevate the towed vehicle preparatory to the actual towing operation. In some instances, elevating and lowering of the dolly wheels is carried out pneumatically or hydraulically, while in other instances ratchet controlled mechanisms serve to raise and lower the dolly wheels. Suitable locking devices are provided for maintaining dolly wheels in desired elevated or lowered positions for storing or towing operations, respectively. Other known mechanisms without ratchet systems are employed for maintaining dolly wheels in elevated or lowered positions.

Although the above briefly described prior developments for towing dollies have been commercially accepted and utilized, it is not uncommon for such known systems to break down in use due to their relatively complex mechanical and/or hydraulic operating systems. Thus, there is a need for an improved towing dolly structure; more specifically one having a more effective elevating and lowering mechanism to which the present invention hereof is directed.

SUMMARY OF THE INVENTION

A towing dolly assembly for elevating and lowering a towed vehicle by engaging a selected pair of coaxial vehicle wheels which employs means for raising and lowering individual dolly wheels between inactive and operational positions; such means comprising a ratchet gear rotatable in response to movement of each dolly wheel spindle axle and adapted to be selectively engaged and disengaged by a tension spring and manually operable handle and pawl means. The handle is equipped with a manually operable lock or safety latch for locking the elevating mechanism in raised or lowered positions of the dolly wheels, as desired.

It is an important object of this invention to provide an improved ratchet type elevating mechanism for use in a trailer style tow dolly for towing disabled vehicles, such as trucks or automobiles.

It is another important object of this invention to provide an improved elevating mechanism as aforesaid, which exhibits a simplified safety ratchet and pawl system leading to economies of manufacture and assembly.

It is a further object of this invention to provide a tow dolly with a ratchet style wheel elevating and lowering mechanism that is capable of automatically locking an associated dolly wheel in elevated and lowered positions.

Having thus described this invention, the above and further features and objects, features, advantages thereof will be recognized and appreciated from the following description of a presently preferred embodiment of the invention illustrated in the accompanying drawings.

IN THE DRAWINGS

DESCRIPTION OF THE PREFERRED EMBODIMENT

Figure 1:
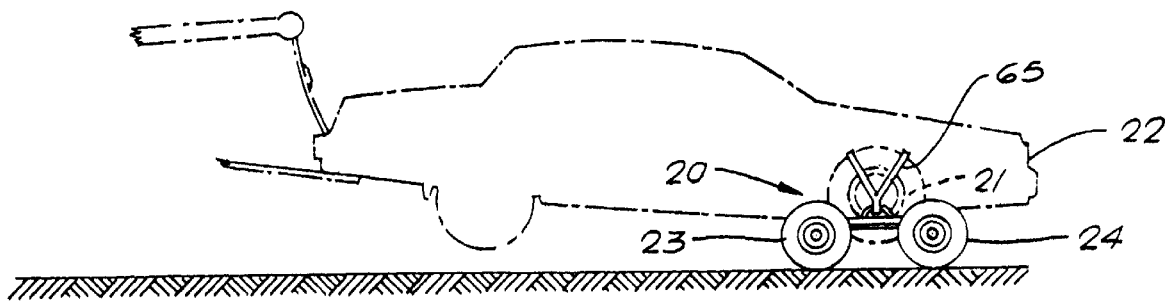
FIG. 1 is a schematic view showing a disabled vehicle in position to be towed employing a tow dolly according to this invention.
Figure 2:
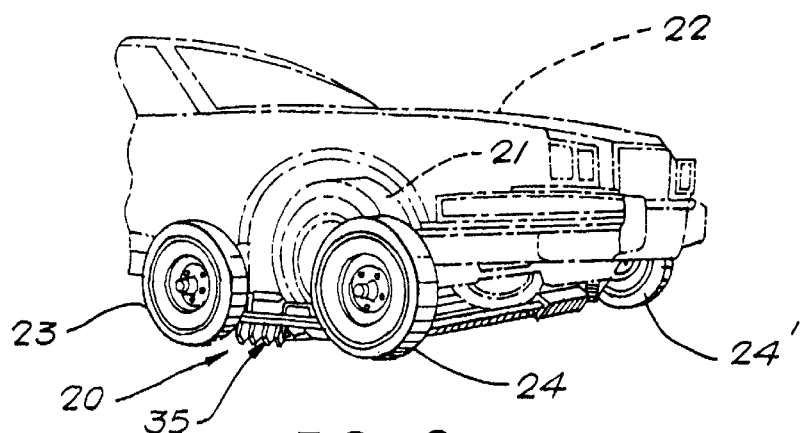
FIG. 2 is a partial, frontal perspective of a tow dolly of this invention in position to elevate the front end of a disabled vehicle to be towed.

FIGS. 1 and 2 illustrate a tow dolly assembly 20, according to this invention, as it is typically related to the front coaxial wheels 21 of a vehicle to be towed, indicated at 22. It will be recognized that FIG. 1, depicts dolly 20 in operational mode for supporting the front end of vehicle 22 in elevated off-the-ground position ready for towing.

In contrast, FIG. 2 illustrates the tow dolly 20 in position straddling the front wheels of the vehicle 22, with dolly wheels 23, 24 raised, or in their upper position preparatory to raising the front vehicle wheels to their elevated positions as shown in FIG. 1.

Figure 3:
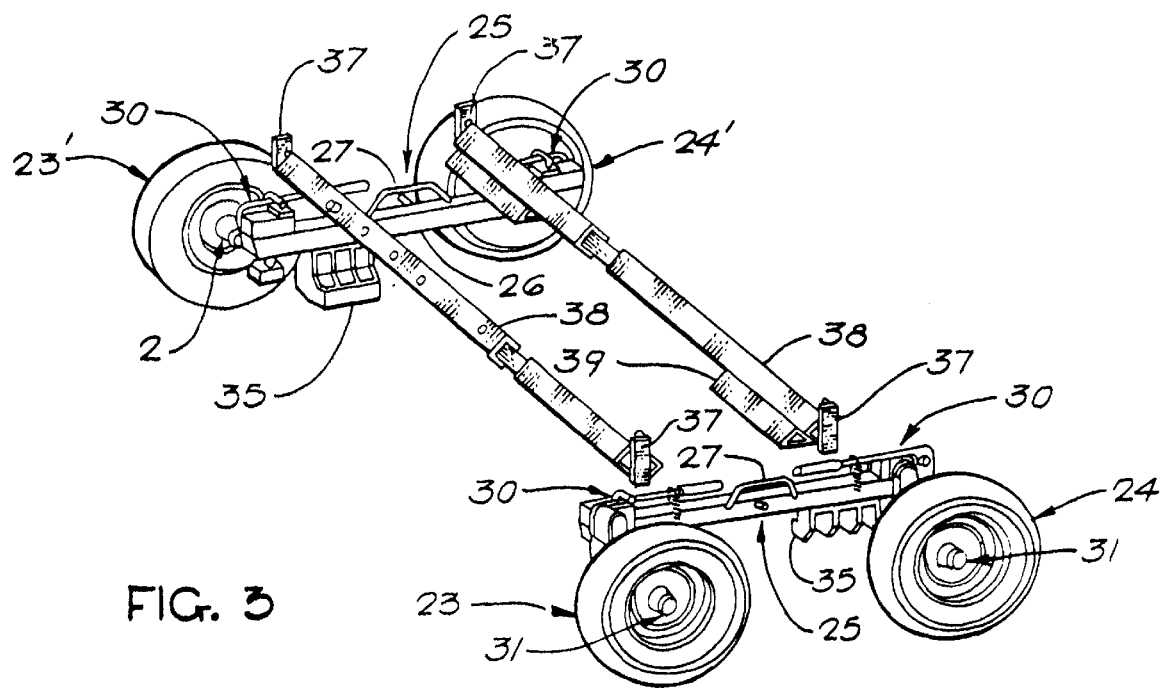
FIG. 3 is an exploded perspective of a tow dolly assembly according to this invention.

FIG. 3 illustrates the several parts which go to make up the knock-down assembly of the tow dolly 20.

Specifically, it will be noted that there are four dolly wheels arranged in pairs 23, 24 and 23', 24' at opposite ends of two dolly assemblies. Each wheel is mounted on a spindle shaft at opposite ends of a dolly assembly 25 made up of a heavy, rigid metal support tube 26 having a carrying handle 27 near its mid-point. Each assembly 25 also includes two spindle actuator mechanisms 30, one at each end of tube 26, for raising and lowering the several dolly wheels, one-by-one as will appear presently.

It will be recognized that each dolly wheel is supported on a central spindle axle assembly 31 which includes the usual wheel supporting hub bearing assemblies, seals, washers, lock nuts, etc. for rotatably supporting a dolly wheel in a known manner.

Located generally beneath each actuator mechanism 30 and fixed to the underside of the associated support tube 26 are axle hangers 35 having plural hanger pockets 36 receptive of metal hanger shoes 37 fixed to opposite ends of elongated adjustable axles 38 of generally square tubular cross section and adjustable in length to accommodate different distances between vehicle wheels.

It also will be noted that each nest of hanger pockets provides plural pockets for receiving the axle hanger shoes as selected to accommodate variations in vehicle tire diameter. In this respect each dolly assembly is placed outboard of a vehicle tire with the axles 38 placed as close as possible to the opposite sides of the tire equipped vehicle wheels 21, in accordance with the placement of the hanger pockets. This provides a rectangular cradle in which the vehicle wheels ride during the towing operation.

Figure 4:
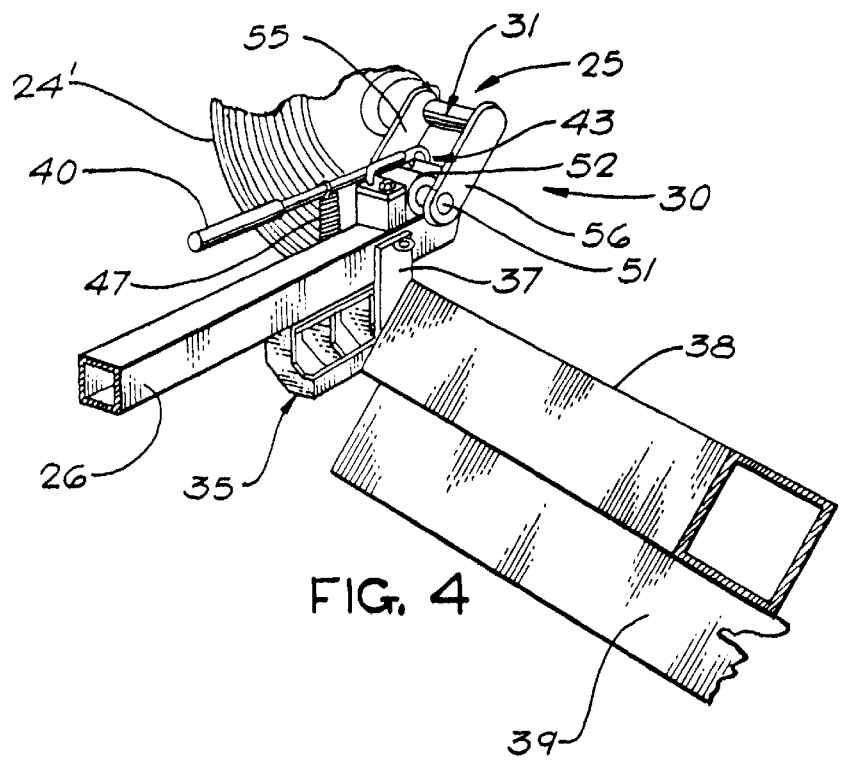
FIG. 4 is a partial enlarged perspective showing of one wheel and elevating mechanism of the tow dolly shown in FIG. 3.
Figure 5:
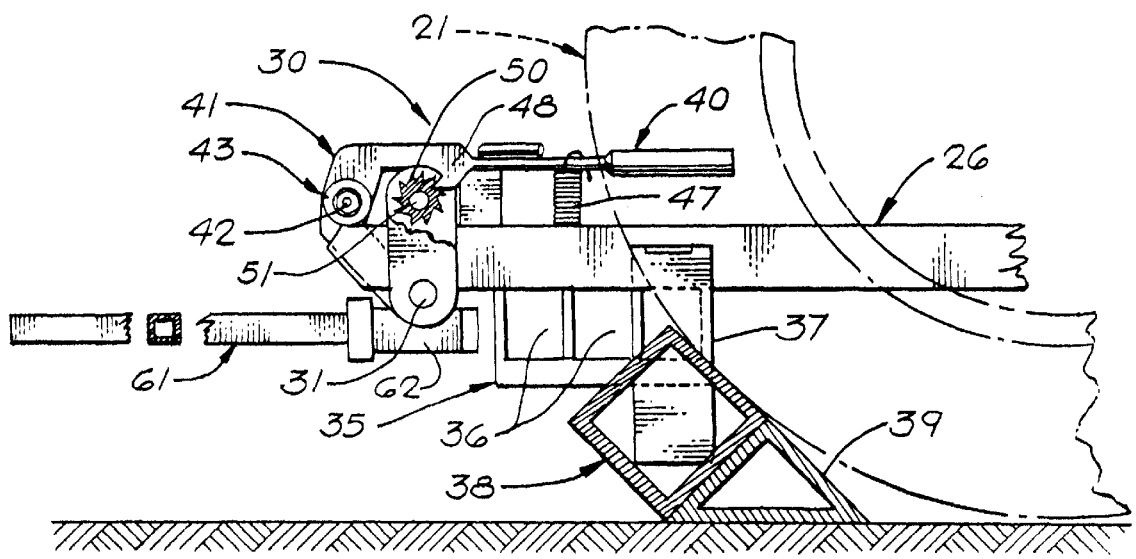
FIG. 5 is an enlarged, partial side elevation of the elevating mechanism shown in FIG. 4, positioned for elevating a vehicle wheel, indicated in phantom thereat.

Of interest is the construction of each axle 38 to include triangular wedge sections 39 spaced axially along one side of the axles 38 to engage the vehicle tires 21, as best shown in FIGS. 4 and 5.

With reference now to FIGS. 5–8 of the drawings, the features and operation of the spindle actuator mechanisms 30 will be described.

Figure 8:
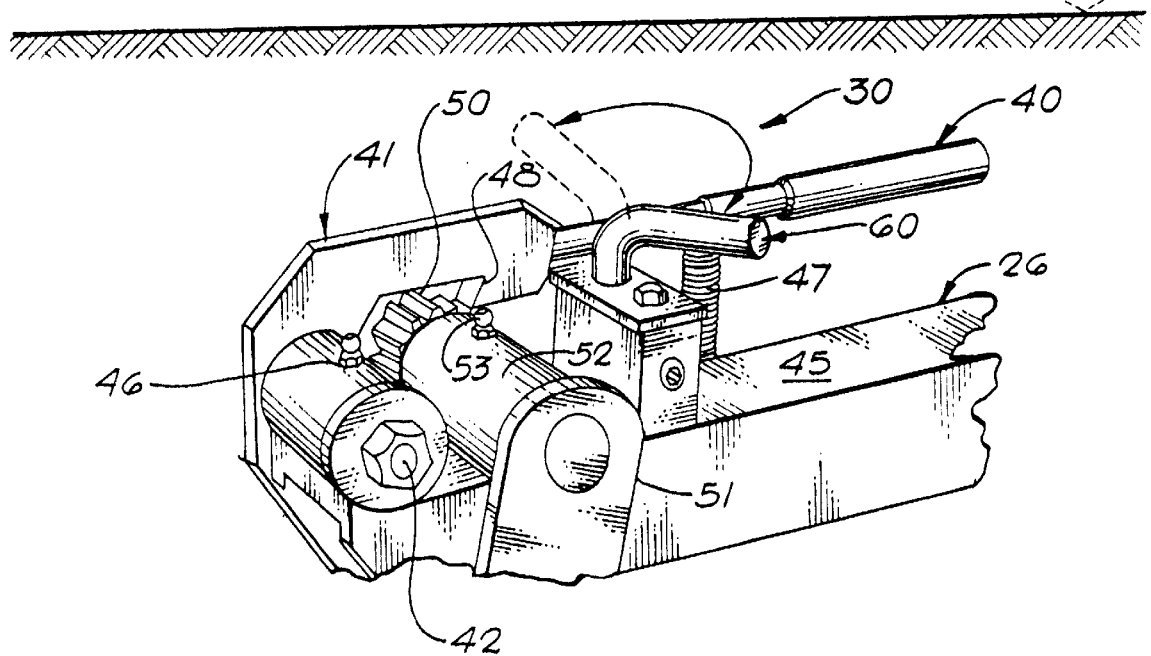
FIG. 8 is an enlarged partial perspective view of the dolly wheel elevating mechanism, illustrating the arrangement of parts therein.

As best shown in FIG. 8, an actuator mechanism 30 is mounted at each end of a support tube 26 and comprises a release handle 40 having a generally C-shaped catch means 41 extending from its outer end; such handle and catch being fixedly mounted on a bolt 42 for rotation therewith. Bolt 42 extends coaxially through a cylindrical hub 43 fixed, as by welding, transversely across the top surface 45 of an associated tube 26. Hub 43 is provided with a grease fitting 46 for lubricating bolt 42.

A tension spring 47 extends between handle 40 and tube 26 to provide an automatic biasing force on handle 40 opposing upward handle movement. Such downward biasing of the handle serves normally to maintain a stop dog projection 48 on the catch 41 in engagement with teeth of a cog wheel 50. This prevents movement of such cog wheel in a reverse direction for safety reasons, as will appear presently (see FIGS. 7 and 8). It is to be noted from FIG. 6 that the extreme outer end of the catch means 41 has a transverse shoe 49 affixed thereto.

Cog wheel 50, as shown best in FIGS. 5–8, is fixed adjacent one end of shaft pin 51 (see FIG. 8) for rotational movement therewith. Pin 51 extends coaxially through a cylindrical sleeve 52 which is welded to the top surface 45 of the associated tube member 26, similar to hub 43 as described above. Appropriate bearings and seals support pin 51 within sleeve 52 for rotatable movement and grease fitting 53 provides lubrication to pin 51.

Fixed to opposite ends of pin 51 are registeringly aligned rigid links 55 and 56 (see FIG. 4); pin 51 passing through and being welded to corresponding ends of such links. The opposite ends of links 55 and 56 are similarly fixed, as by welding, to a spindle shaft 31 which has one end fixed to link 56 while link 55 is fixed against a shoulder intermediate the ends of shaft 31. It will be recognized that in response to rotational movement of pin 51 with attached cog 50, the spindle shaft 31 moves along an arcuate path.

To prevent movement of the spindle shaft with attached dolly wheel and tire as shown in FIG. 2, the pawl 48 on the actuating link 40 is engaged with teeth of the cog wheel 50 and held in such interfering position by the spring means 47. However, if handle 40 is lifted upwardly to disengage pawl 48 from cog 50, then pin 51 is free to rotate either clockwise of counter-clockwise.

As a safety measure, to prevent accidental or unwanted disengagement of the pawl 48 from teeth of the cog wheel, particularly when raising a vehicle wheel, a rotatable safety latch 60 is provided to move over handle 40, as indicated by dotted lines in FIG. 8, or into a non-interfering position to release lever 40, as shown in full lines.

Operation

With reference to FIGS. 2 and 4, it will be recognized that when a dolly 20 is assembled adjacent a selected pair of wheels of a vehicle to be towed, the axles 38 are positioned in front and in back of the vehicle wheels, such as wheels 21 (see FIG. 2).

The dolly wheels are outboard of the vehicle wheels with the elongated axles 38 on the ground and the dolly wheel axle spindles elevated as indicated in FIG. 5.

In order to raise the vehicle wheels off the ground as indicated in FIG. 1, it is necessary to lower the dolly wheels, which requires lowering the dolly wheel spindles 31, one by one. This serves to raise the two dolly axles 38, thus raising the vehicle wheels which are cradled by and between the tubular axles 38, 38. To lower the dolly wheels, a heavy jack handle 61 (see FIG. 5) is inserted into an angularly offset tubular jack socket 62 welded to the underside of spindle shaft 31 midway between the parallel spaced links 55, and 56 (see FIGS. 5–7). In the raised position of the dolly wheels, the wheel spindles 31 are elevated and the jack socket 62 also is in an elevated position, as shown by dotted lines in FIG. 6.

Figure 6:
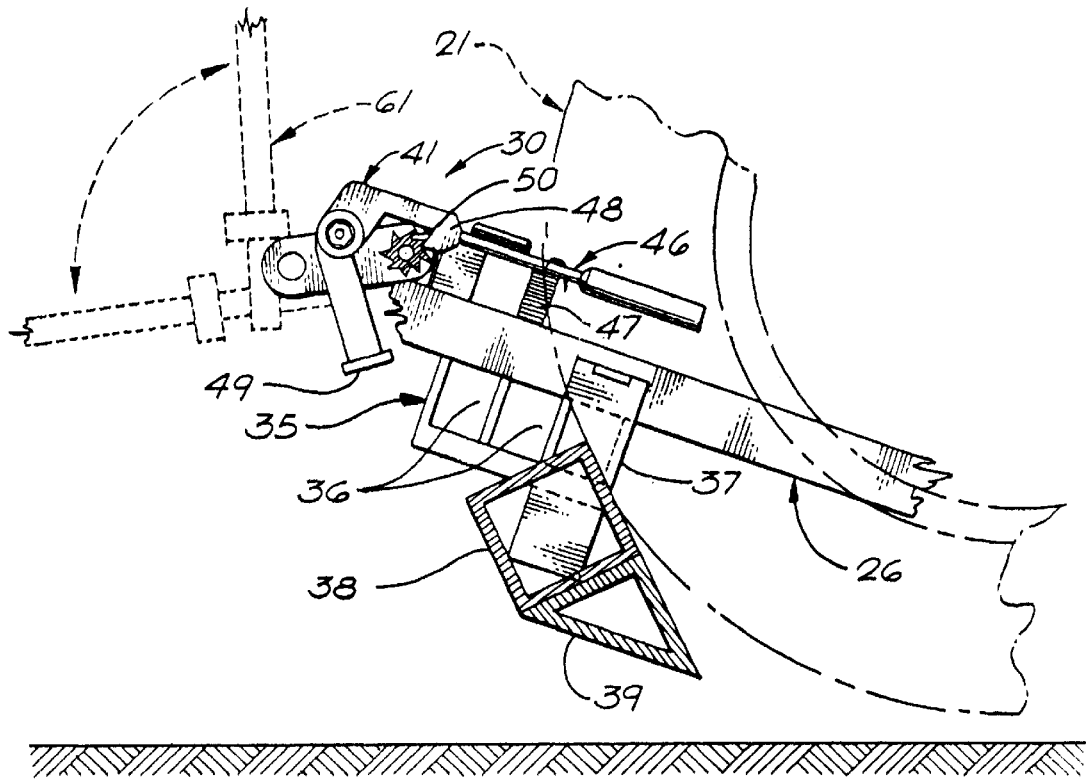
FIG. 6 is another partial side elevation, similar to FIG. 5, showing the elevating mechanism positioned while raising or elevating a disabled vehicle wheel.

Operating the jack handle, after release of the safety latch 60, effects movement of cog wheel 50 past pawl 48 of the release handle 40, but not in a reverse direction (see FIG. 6). Note that this operation permits the pawl 48 to escape each cog wheel tooth as the latter moves to lower the dolly wheel and raise the vehicle. Also note, that the tubular axle 38 adjacent the actuator means 30 being operated is lifted off the ground to maintain its engagement with the vehicle tire, as the latter is raised. Once one dolly wheel is lowered to raise one end of a given dolly assembly 25, safety latch 60 is returned to its locking position preventing accidental movement of the release handle 40. After one end of a dolly is so elevated, the actuator 30 at the opposite end is operated to elevate the other end of the dolly as above described.

Successive lowering of the dolly wheels one-by-one jacks the vehicle wheels 21 off the ground as shown in FIG. 1. Locking the latches 60 over the actuator handles 40 conditions the dolly for towing operation. As shown in FIG. 1 a safety strap 65 is usually harnessed about the vehicle wheels prior to the towing operation.

Figure 7:
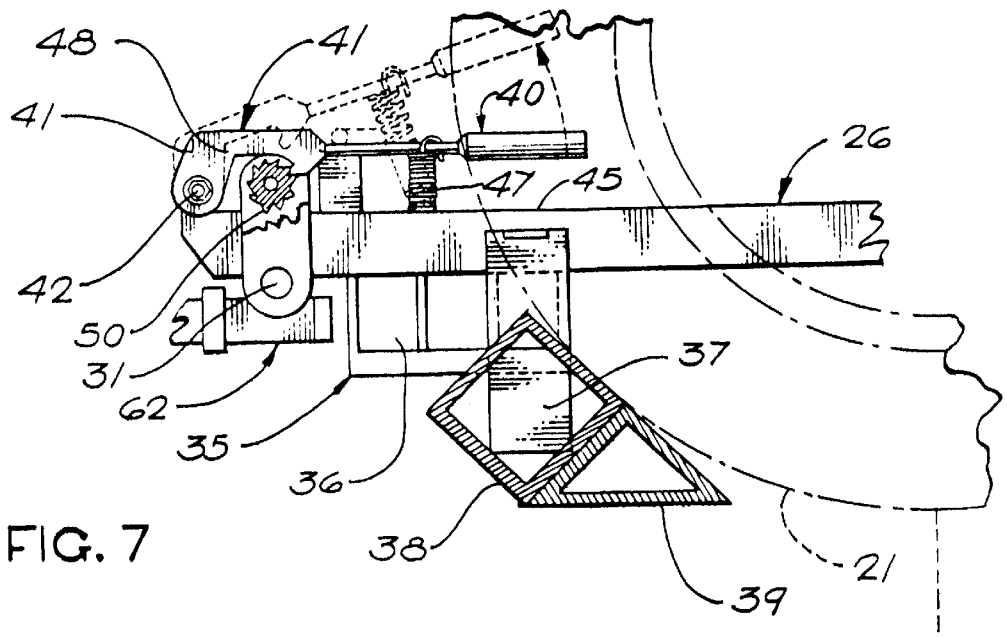
FIG. 7 is another partial side elevation, similar to FIGS. 5 and 6, showing the vehicle wheel fully elevated to towing position.

It is to be noted that as each actuator is exercised to jack the vehicle wheels off the ground, the jack handle 61 eventually resides in a horizontal position as shown in FIG. 7. In this position the dolly wheel spindles 31 are disposed vertically below the cog wheels 50 and the extended end of the catch means 41 with its shoe 49, resides interferingly over the associated dolly wheel spindle 31 (see FIG. 5). This prevents upward arcuate movement of the spindle 51 when handle 40 is held in non-operating position. Thus each lowered dolly wheel will remain locked in its vehicle wheel raising position until released therefrom by lifting the associated actuator handle 40 to disengage the stop dog 48 from the cog wheel.

Once the wheels of each dolly 20 are lowered to raise the vehicle wheels in elevated position, the jack handle 61 is removed and stored away prior to the towing operation.

From the foregoing, it is believed those familiar with the art will readily recognize and appreciate the novel advancement of this invention, and will appreciate that while the same has been described in association with a preferred embodiment shown in the drawings the same is readily susceptible to changes, modifications and substitutions of equivalents without departing from the spirit and scope of this invention which is intended to be unlimited by the foregoing except as appears in the following appended claims.

The embodiments of the invention in which an exclusive property or privilege is claimed are defined as follows:

1. In a trailer type tow dolly having a wheel supported rectangular lift cradle for engaging pairs of coaxial front or rear wheels of vehicles to be towed, an improved assembly for elevating and lowering vehicle wheels engaged by the cradle comprising:

a dolly assembly including rigid, elongated supports which form parallel opposing ends of the cradle;

a spindle actuator mechanism mounted at opposite ends of each of said elongated supports, each said mechanism comprising an arcuately moveable, horizontal spindle axle assembly for rotatably supporting a dolly wheel;

a handle having a catch at an outer end thereof;

said handle and catch being mounted for pivotal movement with a bolt that is rotatably journaled in a horizontal hub member fixed to an associated support; said handle and catch being manually operable to selectively limit arcuate movement of said spindle axle;

a shaft pin rotatably journaled in a sleeve member affixed to said support, parallel to said hub member; and a pair of like rigid links extending between and fixedly interconnecting said shaft pin and said spindle axle whereby said spindle axle is arcuately moveable with rotation of said shaft pin to move an associated dolly wheel mounted on said spindle axle between raised and lowered positions.

2. The apparatus of claim 1, and means for locking said actuator mechanism to prevent movement of said spindle axle.

3. The apparatus of claim 1, wherein said actuator mechanism further comprises a spring means opposing movement of said handle in one direction.

4. The apparatus of claim 3, wherein said actuator mechanism further comprises a pawl fixed to and movably with said handle, and a cog wheel fixed to said shaft pin for movement therewith and normally engaged by said pawl in response to the influence of said spring means.

5. The apparatus of claim 4, wherein said cog wheel is formed with a plurality of spaced teeth about its periphery and said handle comprises said pawl engageable with said teeth to prevent movement of said cog wheel, said shaft pin and said spindle axle in a direction permitting said dolly wheel to be raised.

6. The apparatus of claim 3, wherein said handle has a generally C-shaped outer end, and said catch is a transverse shoe operable to overengage said spindle axle when the latter and said dolly wheel are in lowered position, whereby to prevent movement of said spindle axle and dolly wheel to a raised position until said actuator mechanism is disengaged from said cog wheel.

* * * * *